(12) United States Patent
Chang et al.

(10) Patent No.: US 12,172,839 B2
(45) Date of Patent: Dec. 24, 2024

(54) ORDER MANAGEMENT METHOD AND SYSTEM FOR AUTOMATED LOGISTICS BASED ON ON-DEMAND BOX SUPPLYING

(71) Applicant: ALLY LOGISTIC PROPERTY CO., LTD., Taipei (TW)

(72) Inventors: Chien-Tai Chang, Taipei (TW); Ying-Chien Jang, Taipei (TW); Kai-Lun Lin, Taipei (TW)

(73) Assignee: ALLY LOGISTIC PROPERTY CO., LTD., Taipei (TW)

( * ) Notice: Subject to any disclaimer, the term of this patent is extended or adjusted under 35 U.S.C. 154(b) by 563 days.

(21) Appl. No.: 17/575,900

(22) Filed: Jan. 14, 2022

(65) Prior Publication Data

US 2023/0002162 A1    Jan. 5, 2023

(30) Foreign Application Priority Data

Jul. 2, 2021   (TW) ................................. 110124388

(51) Int. Cl.
| | |
|---|---|
| *B65G 1/137* | (2006.01) |
| *B31B 50/94* | (2017.01) |
| *B65B 5/02* | (2006.01) |
| *B65B 5/04* | (2006.01) |
| *B65B 35/16* | (2006.01) |
| *B65B 43/10* | (2006.01) |
| *B65B 57/10* | (2006.01) |
| *B65B 59/00* | (2006.01) |
| *B31B 120/30* | (2017.01) |

(52) U.S. Cl.
CPC ............ *B65G 1/1378* (2013.01); *B31B 50/94* (2017.08); *B65B 5/024* (2013.01); *B65B 5/04* (2013.01); *B65B 35/16* (2013.01); *B65B 43/10* (2013.01); *B65B 57/10* (2013.01); *B65B 59/001* (2019.05); *B65G 1/1371* (2013.01); *B31B 2120/302* (2017.08)

(58) Field of Classification Search
CPC .... B65G 1/1378; B65G 1/1371; B31B 50/94; B31B 2120/302; B65B 59/001; B65B 5/024; B65B 5/04; B65B 35/16; B65B 43/10; B65B 57/10
See application file for complete search history.

(56) References Cited

U.S. PATENT DOCUMENTS

| | | | |
|---|---|---|---|
| 10,737,819 B1 * | 8/2020 | Xu | ............................. B65B 7/16 |
| 2013/0247519 A1 * | 9/2013 | Clark | ...................... B65B 57/00 |
| | | | 53/452 |

(Continued)

*Primary Examiner* — Kyle O Logan
(74) *Attorney, Agent, or Firm* — Muncy, Geissler, Olds & Lowe, P.C.

(57) ABSTRACT

An order management system and method for automated logistics based on-demand box supplying is disclosed. The system pre-estimates a dimension required by all of the merchandise according to an order data, and selects a sheet material according to the size to form a finished container. The dimension of the unfolded sheet material before folding into the finished container is quite small. In terms of warehouse space utilization, a space required by a single finished and folded box is able to stack dozens of sheet materials, so that the warehousing efficiency is greatly improved. By integrating with a box folding module and a sealing module, fully automated logistics can be achieved with human intervention.

8 Claims, 8 Drawing Sheets

(56) References Cited

U.S. PATENT DOCUMENTS

| | | | |
|---|---|---|---|
| 2014/0325942 A1* | 11/2014 | Richards | B31B 50/26 493/55 |
| 2015/0360801 A1* | 12/2015 | Sytema | B65B 49/16 53/74 |
| 2015/0367974 A1* | 12/2015 | Sytema | B65B 43/10 53/461 |
| 2016/0176638 A1* | 6/2016 | Toebes | G05D 1/0282 701/25 |
| 2016/0185065 A1* | 6/2016 | Sytema | B65B 5/024 493/183 |
| 2016/0355337 A1* | 12/2016 | Lert | B65G 1/0492 |
| 2018/0050833 A1* | 2/2018 | Sytema | B65B 5/028 |
| 2018/0215117 A1* | 8/2018 | De Boer | B65B 61/025 |
| 2018/0215485 A1* | 8/2018 | Koet | B65B 5/12 |
| 2019/0233142 A1* | 8/2019 | Jonker | B65B 5/024 |
| 2020/0207491 A1* | 7/2020 | Koet | B31B 50/741 |
| 2020/0398916 A1* | 12/2020 | Finke | B62D 65/18 |
| 2021/0047115 A1* | 2/2021 | Aiglstorfer | B25J 15/0625 |
| 2021/0130024 A1* | 5/2021 | Liu | B65B 51/067 |
| 2021/0221615 A1* | 7/2021 | Buchmann | B65G 1/1373 |
| 2021/0237913 A1* | 8/2021 | van Wonderen | B65B 5/06 |
| 2021/0237914 A1* | 8/2021 | Jonker | B65B 7/28 |
| 2022/0033123 A1* | 2/2022 | Zheng | B65B 59/003 |
| 2023/0134346 A1* | 5/2023 | Long | B29C 66/431 156/217 |

* cited by examiner

ORDER MANAGEMENT METHOD AND SYSTEM FOR AUTOMATED LOGISTICS BASED ON ON-DEMAND BOX SUPPLYING

FIELD OF THE INVENTION

The invention relates to a order management method and system for automated logistics, and particularly relates to a order management method and system for automated logistics using on-demand box supplying.

BACKGROUND OF THE INVENTION

Transportation of goods is always an important issue in modern society. With the vigorous development of network applications, online shopping is almost inseparable to human life. Various types of online shopping platforms, modes, and delivery have emerged one after another.

In the field of logistic operations, disposal of orders is a major issue in the overall work. The workload and cost of picking and tallying procedure are main parts of the overall logistic operations. The disposal of cargo packing for each order is one of the core operations of the logistics. In the existing art, logistics services providers must plan warehousing facilities for stacking a large quantity of containers for shipment. After receiving an order, logistics services providers select the container for packing according to the order.

For a three-dimensional container (such as a box), it has a large volume and requires a warehousing facility with a certain height and area, which not only consumes extremely high site cost but also is a big burden and challenge for transportation in a warehouse.

SUMMARY OF THE INVENTION

In order to solve the above-mentioned problems, the invention provides a order management method and system for automated logistics using on-demand box supplying, which automatically provides a packing container in a corresponding size according to an order demand, so that the packing efficiency is effectively improved, and the warehousing space needed for storage is reduced.

In order to achieve the above-mentioned objective, the invention provides a order management system for automated logistics using on-demand box supplying, including: a warehousing facility, an automatic box folding module, an automatic sealing module, an automatic picking module, and a plurality of carrying robots. The warehousing facility includes a plurality of sub goods shelves which are mobile and used to hold different types of merchandises. Each of the plurality of sub goods shelves is placed with a plurality of same merchandises. The automatic box folding module includes a storage region, a first output region and a box folding device located between the storage region and the first output region. A first packing material and a second packing material which have different sizes are placed in the storage region. The box folding device folds one of the first packing material and the second packing material into a container, the first packing material and the second packing material are selected according to at least one information of an order data. The automatic sealing module includes a receiving region, a second output region and a sealing device located between the receiving region and the second output region. The automatic picking module includes a picking table and a plurality of picking robots arranged on the picking table. The plurality of carrying robots include a plurality of first carrying robots movably arranged between the automatic picking module and the warehousing facility and a plurality of second carrying robots movably arranged between the automatic picking module, the automatic box folding module, and the automatic sealing module. The plurality of first carrying robots moves the sub goods shelf selected according to the order data from the warehousing facility to the automatic picking module, and the plurality of second carrying robots moves the container selected according to the order data from the automatic box folding module to the automatic picking module. The automatic picking module puts the merchandise of the sub goods shelf into the container according to the order data; and the plurality of second carrying robots moves the container packed to the automatic sealing module.

In order to achieve the above-mentioned objectives, the invention further provides a order management method for automated logistics using on-demand box supplying, comprising the following steps: receiving an order data; selecting a packing material corresponding to the order data from a plurality of packing materials with different sizes according to the order data, and folding the packing material into a container by an automatic box folding module. The container is moved by a second carrying robot to an automatic picking module; moving at least one selected sub goods shelf from a warehousing facility to the automatic picking module according to the order data by a first carrying robot; putting a merchandise on the selected sub goods shelf into the container according to the order data by a picking robot; and moving the container by the second carrying robot to an automatic sealing module. The automatic sealing module performs a sealing operation on the container to form a sealed box.

DETAILED DESCRIPTION OF THE PREFERRED EMBODIMENTS

Figure 1:
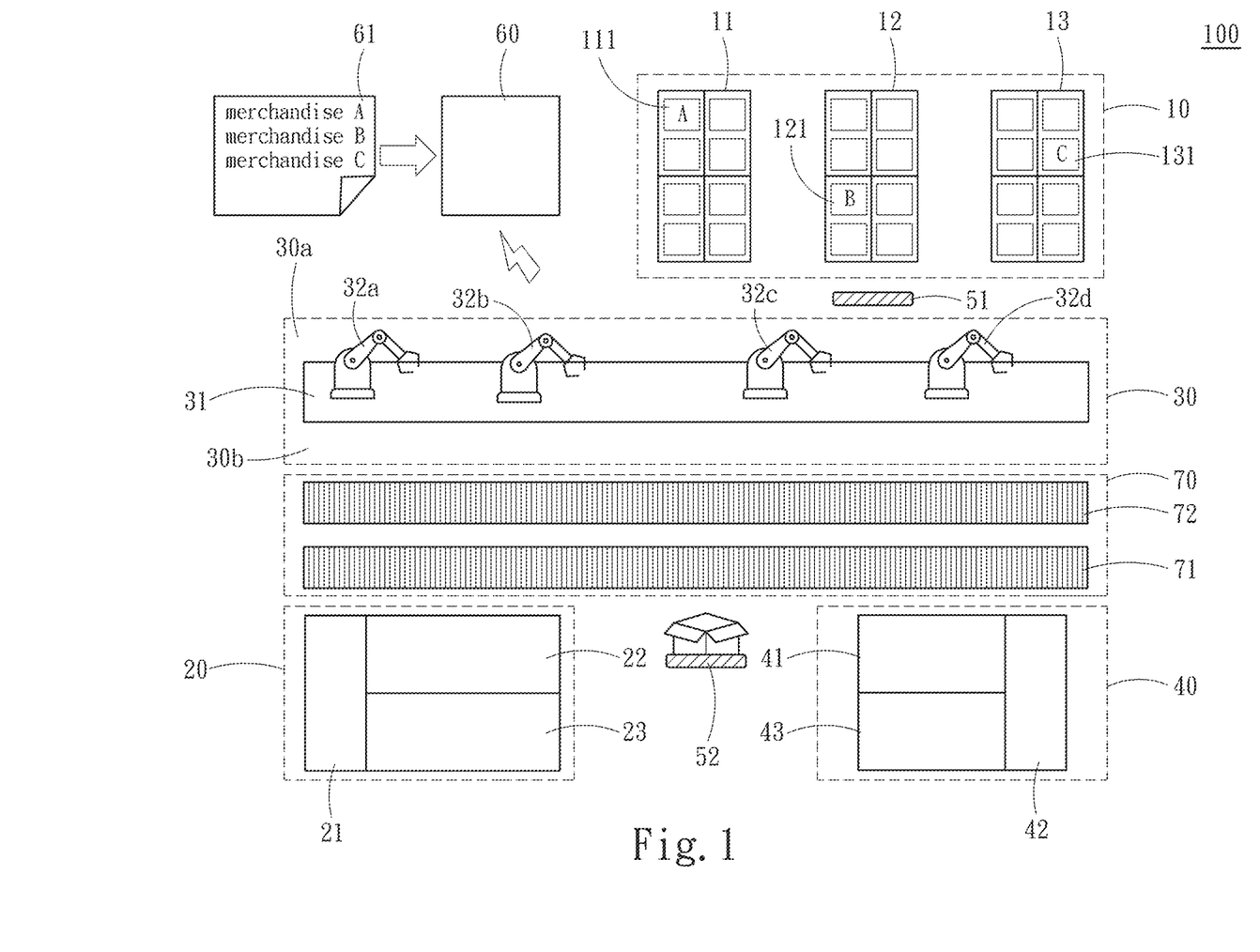
FIG. 1 is a schematic diagram of configuration according to one embodiment of the invention.

Please refer to FIG. 1, the invention provides a order management system 100 for automated logistics using on-demand box supplying, which is applied to a space in a building or a warehouse for handling logistics order. The system 100 includes a warehousing facility 10, a box folding module 20, a picking module 30, a sealing module 40, a plurality of mobile drive units, and a computer device 60. The box folding module 20 and the sealing module 40 may be an automated box folding machine and an automated sealing machine, respectively. In one embodiment, the warehousing facility 10, the box folding module 20, the picking module 30, the sealing module 40 and the plurality of mobile drive units are all located on one or plurality of floors of the space. The drawings herein are regarded as schematic diagrams of configurations in top view. In the system 100, a flattened container (e.g. unfolded and flattened cardboard box or unassembled carton) with a specific capacity will be selected upon receiving order data 61 and then made into a finished container (e.g. folded cardboard box or assembled carton ready for filling), which is specified based on the dimension of the merchandise according to the order data 61, for proceeding the picking and sealing procedure. Comparing with supplying the cardboard box from a plenty of finished boxes stacked in the warehouse, the system and method of the present disclosure reduces the humor resources effectively and improves the processing efficiency. According to one embodiment of the present invention, the order management system 100 is used in e-commerce industry for distribution of goods/products.

The picking module 30 has a receiving side 30*a* and a picking side 30*b*. In one embodiment, the layout of the warehousing facility 10, the box folding module 20 and the sealing module 40 is defined according to the receiving side 30*a* and the picking side 30*b*. The warehousing facility 10 is close to the receiving side 30*a* of the picking module 30. The box folding module 20 and the sealing module 40 are close to the picking side 30*b* of the picking module 30.

The warehousing facility 10 comprises at least one shelf 11, 12, 13 for storing inventory items to be packaged and shipped. The shelves 11, 12, 13 respectively comprise a plurality of sub-shelves 111, 121, 131. Each of the plurality of sub-shelves 111, 121, 131, is placed with a plurality of same merchandises. A, B, C respectively denotes merchandise A, merchandise B, and merchandise C as shown in the drawings. The sub-shelves 111, 121, 131 are movable. Namely, they are able to be respectively moved out of the shelves 11, 12, 13. Further, each of the sub-shelves 111, 121, 131 includes an independent machine-readable optical label (such as barcode or QR code) which corresponds to the type of the merchandise. In one embodiment, the shelf 11 stores all of the sub-shelves 111, and all of the sub-shelves 111 hold merchandise A (the shelves 12, 13 do the same). Alternatively, the shelf 11 stores a plurality of sub-shelves used to hold different merchandises. For example, the shelf 11 stores a sub-shelf holding merchandise A, a sub-shelf holding merchandise B, a sub-shelf holding merchandise C, etc.

The box folding module 20 comprises a storage region 21, a first export region 22 and a box folding device 23. The storage region 21 is configured to stack a plurality of sheet materials in unfold and flattened form. The box folding device 23 is placed between the storage region 21 and the first export region 22 to receive and fold the sheet materials into a container in three-dimensional shape. In the following embodiments, a cardboard box serving as the container is taken as an example, and the sheet material is flattened cardboard that is not formed into a box yet.

The picking module 30 includes a picking platform 31 and a plurality of picking robots, 32*a*, 32*b*, 32*c*, 32*d*. The plurality of picking robots, 32*a*, 32*b*, 32*c*, 32*d* moves the merchandises which come from the warehousing facility 10 according to the order data 61 placed on the receiving side 30*a* to the picking side 30*b*, so as to facilitate the subsequent shipping process. In one embodiment, the plurality of picking robots 32*a*, 32*b*, 32*c*, 32*d* is a robotic arm arranged side by side on the picking platform 31.

The sealing module 40 includes a feeding region 41, a second export region 42 and a sealing device 43. The sealing device 43 is placed between the feeding region 41 and the second export region 42 to seal the container hold the merchandise and export the container for subsequent shipment.

The plurality of mobile drive unit includes at least one first mobile drive unit 51 and at least one second mobile drive unit 52. The plurality of mobile drive units is an automated guided vehicle (AGV) or an automated mobile robot (AMR). The plurality of first mobile drive unit 51 is movably arranged between the picking platform 31 and the warehousing facility 10 and moves the sub-shelves 111, 121, 131 loaded with the merchandises (in other embodiments, the plurality of first mobile drive unit 51 may also directly carry the merchandise). In one embodiment, the plurality of first mobile drive unit 51 comprises a sensor (e.g. RFID, laser or image based scanners) for identifying the label. As such the merchandises on the sub-shelves 111, 121, 131 can be identified and then picked based on the order data 61. The plurality of second mobile drive unit 52 is movably arranged between the picking platform 31, the box folding module 20, and the sealing module 40 to move the container from the box folding module 20 to the picking platform 31 and/or move the container from the picking platform 31 to the sealing module 40.

The computer device 60 is configured to support the operation of the system and method. The computer device 60 is communicatively connected with and controls the box folding module 20, the picking module 30, the sealing module 40, the plurality of first mobile drive units 51, and the plurality of second mobile drive units 52.

In one embodiment, the system 100 further includes a transportation aisle 70. The transportation aisle 70 is close to the picking side 30*b* of the picking module 30 and is defined between the picking module 30, the box folding module 20, and the sealing module 40. In one embodiment, the transportation aisle 70 includes a collection area 71 and a shipment area 72. The collection area 71 and the shipment area 72 respectively extend from one side of the box folding module 20 to one side of the sealing module 40. The transportation aisle 70 is defined as a region that is not occupied by any facilities so as to allow the plurality of second mobile drive units 52 to move quickly without obstruction between the box folding module 20, the picking module 30, and the sealing module 40. Further, the plurality of picking robots, 32*a*, 32*b*, 32*c*, 32*d* are arranged side by side on the picking platform 31 in a predetermined direction (in FIG. 1, a direction from left to right). The collection area 71 and the shipment area 72 also extend in the predetermined direction, so that the plurality of second mobile drive units 52 initially moves straight from the box folding module 20 to the collection area 71, then transversely moves along the collection area 71 to the position of any one of the plurality of picking robots 32*a*, 32*b*, 32*c*, 32*d*, corresponding to the collection area 71, and then moves straight to the position of any one of the plurality of picking robots 32*a*, 32*b*, 32*c*, 32*d* corresponding to the picking side 30*b*. Furthermore, the plurality of second mobile drive units 52 initially moves straight from the position of any one of the plurality of picking robots 32*a*, 32*b*, 32*c*, 32*d*, corresponding to the picking side 30*b* to the shipment area 72, then transversely moves along the shipment area 72 to the position of the sealing module 40 corresponding to the shipment area 72, and then moves straight to the sealing module 40, as shown in the drawings.

Figure 2:
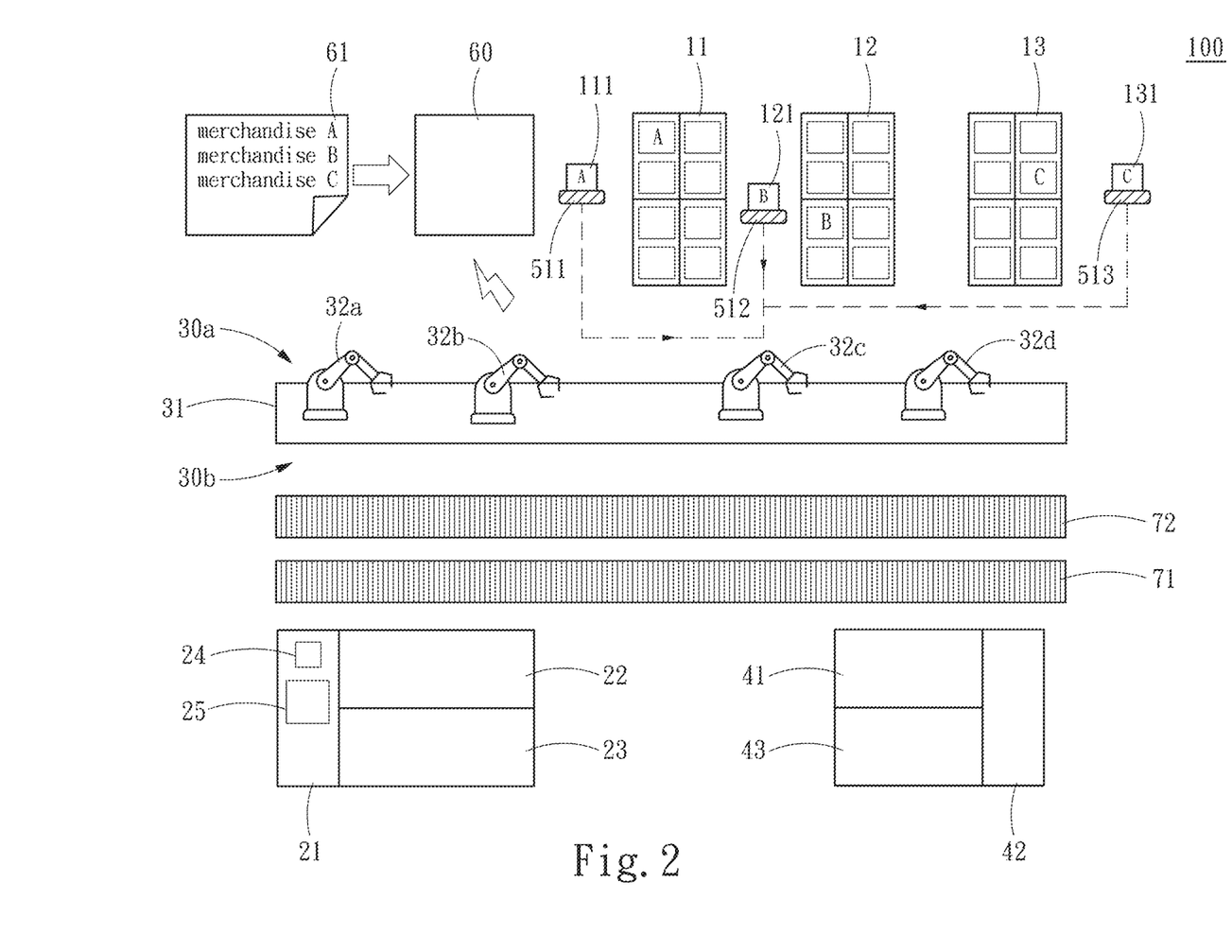
FIG. 2, FIG. 3, FIG. 4, FIG. 5, FIG. 6, and FIG. 7 are schematic diagrams of operation procedures according to one embodiment of the invention.

FIG. 2, FIG. 3, FIG. 4, FIG. 5, FIG. 6, and FIG. 7 are schematic diagrams of operation procedures according to one embodiment of the invention. Referring to FIG. 2, once the computer device 60 receives the order data 61, the computer device 60 controls, according to the order data 61, the plurality of first mobile drive units 511, 512, 513 and the second mobile drive unit 52, and instructs the plurality of first mobile drive units 511, 512, 513 to move to the plurality of shelves 11, 12, 13 of the warehousing facility 10. The plurality of sub-shelves 111, 121, 131 and merchandises thereon are transported according to the instruction of the computer device 60 and then are moved to the receiving side 30*a* of the picking module 30. In FIG. 2, the plurality of first mobile drive units respectively carrying the plurality of sub-shelves is taken as an example (i.e., one of the plurality of first mobile drive units carries one of the plurality of sub-shelves). In other embodiments, it is also possible that one of the plurality of first mobile drive units carries the plurality of sub-shelves. In the embodiment of FIG. 2, the order data 61 includes a merchandise A, a merchandise B, and a merchandise C.

Figure 3:
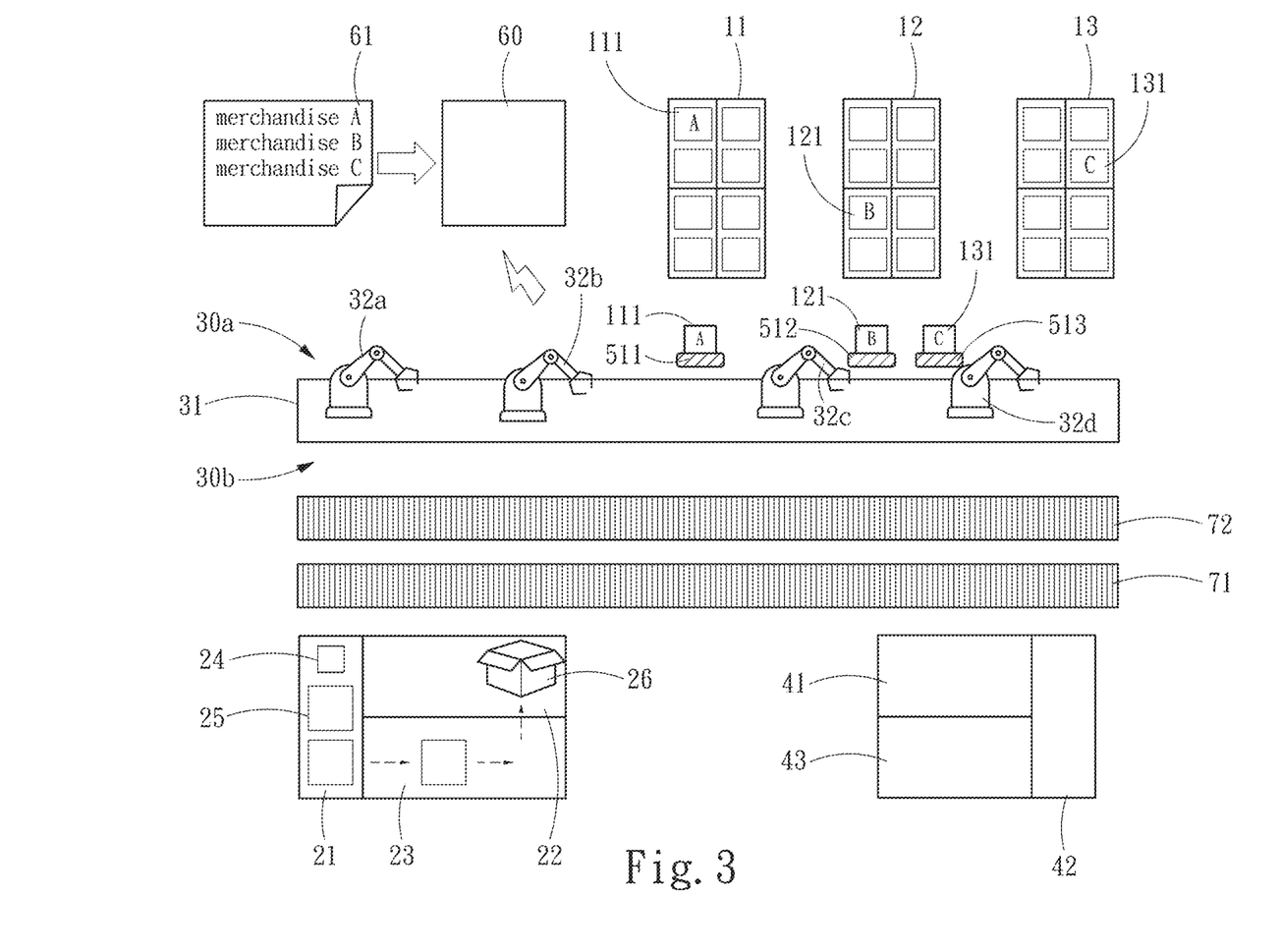

Referring to FIG. 3, once the computer device 60 receives the order data 61, the computer device 60 controls feeding of a sheet material from the storage region 21 to the box folding device 23 to from a container 26, and transport the container 26 to the first export region 22 in accordance with the order data 61. In the invention, a plurality of sheet materials in unfold and flattened form with different sizes for package are stacked in the storage region 21. A plurality of first sheet materials 24 and a plurality of second sheet materials 25 are used as an example. The size of each of plurality of second sheet materials 25 is greater than that of each of plurality of first sheet materials 24. The box folding device 23 selects, according to the order data 61, one of the plurality of first sheet materials 24 or the second sheet materials 25 (one of the plurality of second sheet materials 25 is selected) from the storage region 21 for the box folding and forming operation. In one embodiment, the computer device 60 selects a proper sheet material according to the quantity, types, sizes, and/or the dimensions of the merchandises in accordance of the order data 61, and commands the box folding device 23 to perform the box folding and forming operation on the first sheet materials 24 or the second sheet materials 25.

In one embodiment, the sheet materials are flat cardboards stacked in the storage region 21. In the box folding and forming operation, the box folding device 23 folds the sheet material to form into a three-dimensional structure as a container. In one example, the box folding device 23 further seals the bottom of the container 26 by sticking a tape. The container 26 includes an accommodating space and an accessible opening on top. In one embodiment, the box folding and forming operation includes jet printing of a machine-readable optical label, placement of a buffer packaging material, and other programs, so as to facilitate subsequent logistic operations and reduce collision and damage of merchandises during shipment.

Figure 4:
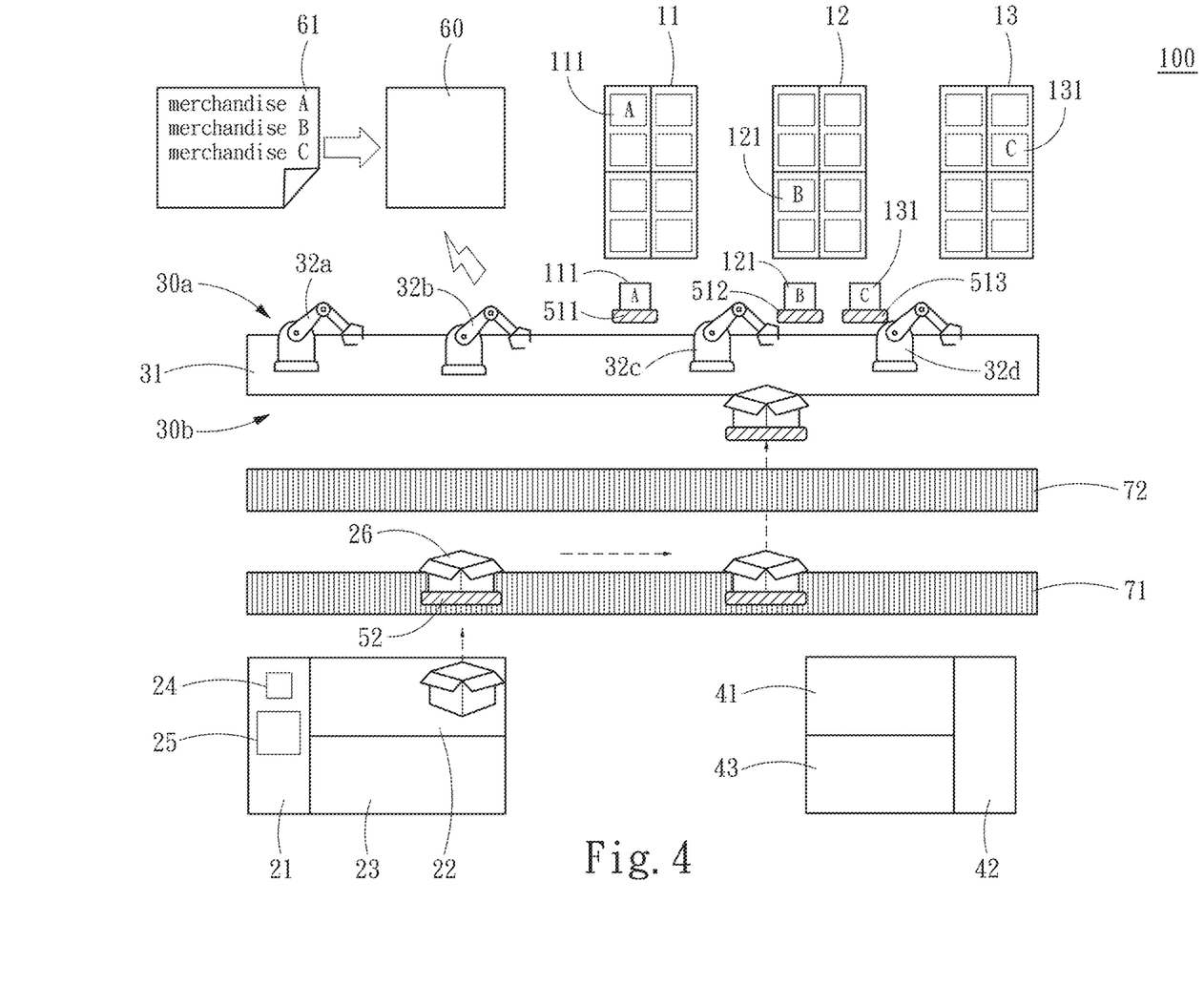

Referring to FIG. 4, as operations shown in FIG. 3 are completed, the second mobile drive unit 52 receives the folded container 26 from the first export region 22 of the box folding module 20, and transports the container 26 along the collection area 71 to the picking side 30b of the picking module 30.

An operation sequence of FIG. 2 and FIG. 3 can be adjustable according to a user's need. Specifically, the steps of FIG. 2 may be carried out first, and the steps of FIG. 3 and FIG. 4 are then carried out. Alternatively, the steps of FIG. 3 and FIG. 4 may be carried out first, and the steps of FIG. 2 are then carried out. Alternatively, the steps of FIG. 2, FIG. 3, and FIG. 4 are carried out at the same time. A proper adjustment may be made according to the workload of each station.

Figure 5:
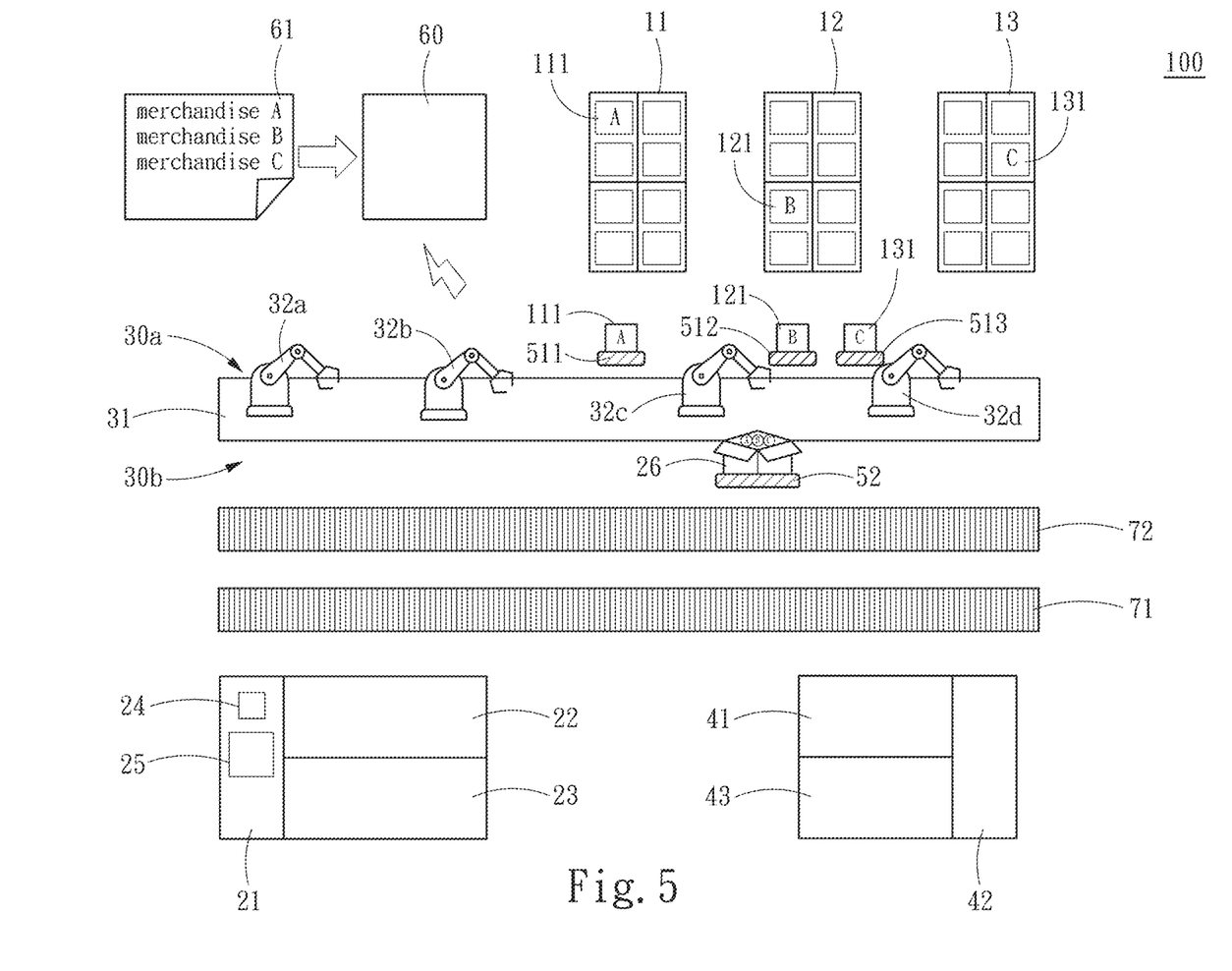

Referring to FIG. 5, once the merchandises (not placed into the container yet) transported from the plurality of sub-shelves 111, 121, 131 to the picking platform 31 (i.e., the steps show in FIG. 2 are completed), and as well as the container 26 is transported to the picking platform 31 (i.e., the steps shown in FIG. 4 are completed), the picking robot 32c puts the merchandise A, the merchandise B, and the merchandise C into the container 26. In other embodiments, when the plurality of sub-shelves 111, 121, 131 arrive the picking platform 31, and the container 26 has not arrived the picking platform 31, the picking robot 32c is also able to move the merchandise A, the merchandise B, and the merchandise C to a temporary storage region of the picking platform 31 first. At this time, the plurality of first mobile drive units 511, 512, 513, is able to return the plurality of sub-shelves 111, 121, 131 to the plurality of shelves 11, 12, 13, and moves on a next task.

Figure 6:
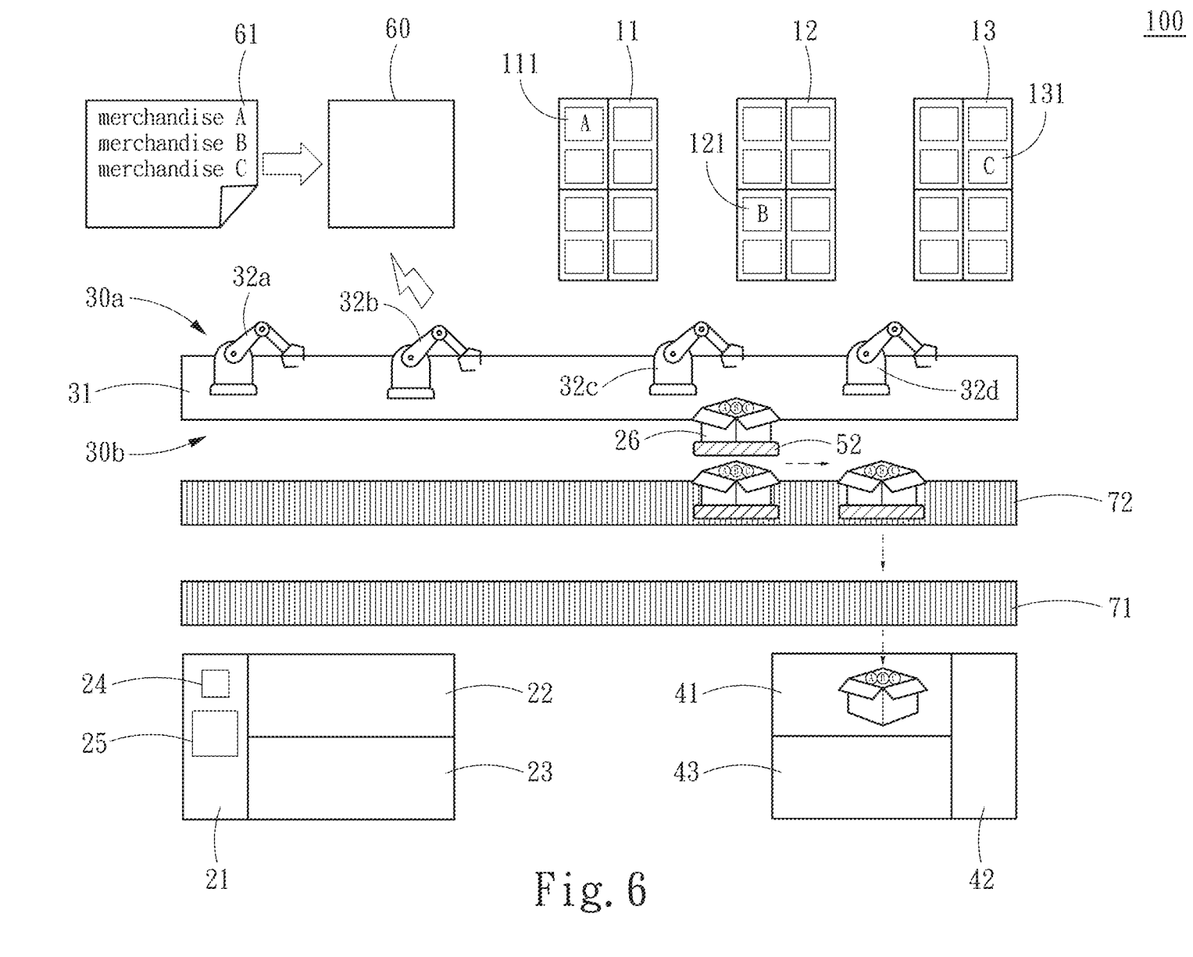

Referring to FIG. 6, after the operation shown in FIG. 5 is completed, the second mobile drive unit 52 transports the container 26 loaded with these merchandises from the picking platform 31 to the feeding region 41 of the sealing module 40 along the shipment area 72.

Figure 7:
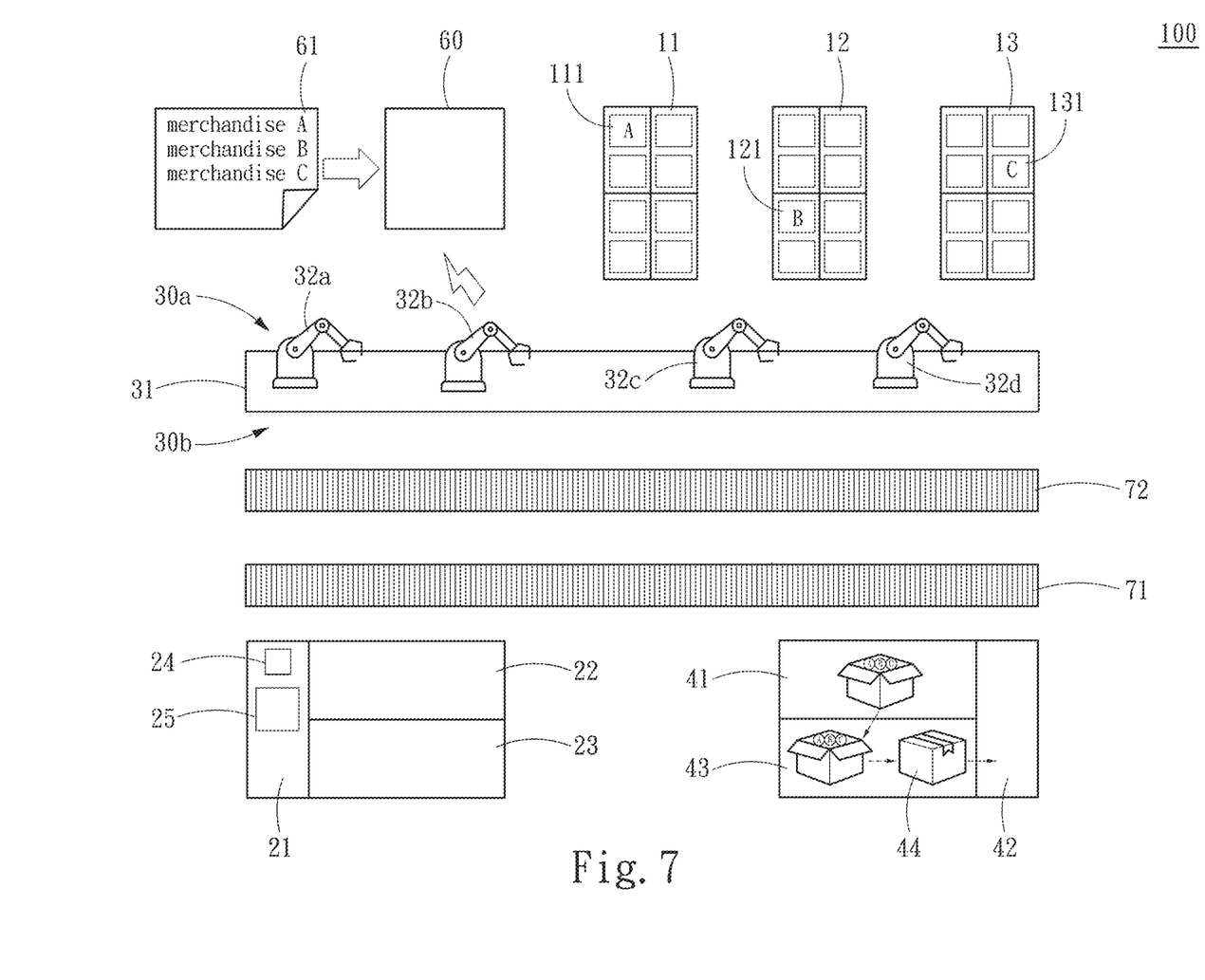

Referring to FIG. 7, after the container 26 loaded with these merchandises is moved to the feeding region 41, the sealing device 43 of the sealing module 40 performs a sealing operation on the loaded container 26 to form a sealed box 44, and transports the sealed box 44 to the second export region 42. The sealing device 43 folds the upper part of the container 26 to close the opening, and seals the top of the container 26 by sticking a tape to form the sealed box 44.

Figure 8:
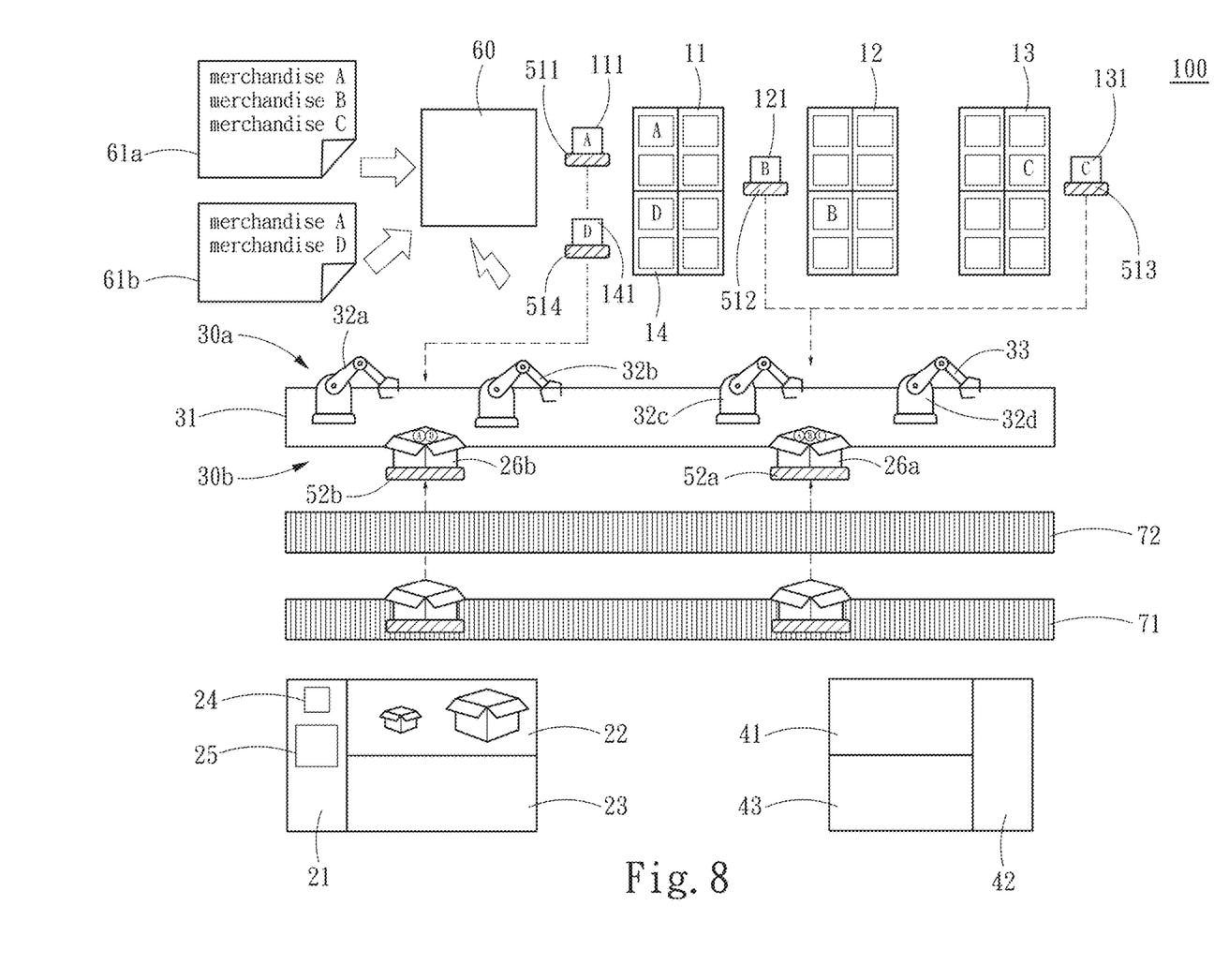
FIG. 8 is a schematic diagram of configuration according to one embodiment of the invention.

Referring to FIG. 8, a schematic diagram of arrangement according to one embodiment of the invention is illustrated. When the computer device 60 receives a first order data 61a (merchandise A, merchandise B, and merchandise C) and a second order data 61b (merchandise A and merchandise D), the computer device 60 controls the plurality of first mobile drive units 511, 512, 513, 514, to pick the plurality of sub-shelves 111, 121, 131, 141 loaded with the merchandise A, the merchandise B, the merchandise C and the merchandise D from the plurality of shelves 11, 12, 13, and controls the box folding device 23 to select, based on the first order data 61a and the second order data 61b, one of the plurality of first sheet materials 24 or second sheet materials 25 with the corresponding size. In this example, a dimension of the total merchandises of the first order data 61a and a demanded container are larger than those of the second order data 61b. Then, the second sheet material 25 and the first sheet material 24 are folded to respectively form a first container 26a and a second container 26b (the second sheet material 25 and the first sheet material 24 respectively correspond to the first container 26a and the second container 26b, and the first container 26a is larger than the second container 26b. The figures are for schematic purposes only). Next, the picking module 30 places the merchandise A, the merchandise B, and the merchandise C into the first container 26a according to the first order data 61a, and places the merchandise A and the merchandise D into the second container 26b according to the second order data 61b, and performs the sealing operation via the sealing module 40. As shown in the figure, the system 100 folds a sheet material according to the received order data 61a, 61b to realize an on-demand logistic procedure.

The system pre-estimates a dimension required by all of the merchandises in the order according to the order data, then selects a sheet material according to the dimension to form the container. In other words, the system decides the sheet material to be folded according to needs only when receiving the order data. The sheet material has a small dimension (which is generally a flat paperboard) before folding and easy to stack. In terms of warehouse space utilization, a space required by a single finished and folded box is able to stack dozens of sheet materials, so that the warehousing efficiency is greatly improved and a dynamic storage logistic can be achieved. Furthermore, once the sheet material is formed into the container, the folding, loading, sealing and shipping processes are performed, which means that the time a folded box retained in the warehousing facility is short. Due to the configurations of the box folding module and the sealing module, an on-demand box supplying can be achieved without human presence on-site, so that the packing efficiency is effectively improved, and the warehousing space needed for storage is reduced.

What is claimed is:

1. An order management system for automated logistics based on on-demand box supplying, comprising:
    a warehousing facility, comprising a plurality of sub-shelves which are movable and configured to store different types of merchandise, wherein each of the sub-shelves is configured to store the same merchandise;
    a box folding module, comprising a storage region, a first export region and a box folding device located between the storage region and the first export region, wherein a first sheet material and a second sheet material with different sizes are arranged in the storage region, the box folding device folds either the first sheet material or the second sheet material into a container, the first sheet material and the second sheet material are selected according to at least one information of an order data, and the information is a quantity, types, sizes or volumes of merchandises;
    an sealing module, comprising a receiving region, a second export region and a sealing device located between the receiving region and the second export region;
    a picking module, comprising a picking platform and a plurality of picking robots arranged on the picking platform;
    a plurality of mobile drive units, comprising a plurality of first mobile drive units movably arranged between the picking module and the warehousing facility and a plurality of second mobile drive units movably arranged between the picking module, the box folding module, and the sealing module, wherein the plurality of first mobile drive units moves the sub-shelf selected according to the order data from the warehousing facility to the picking module, and the plurality of second mobile drive units moves the container selected according to the order data from the box folding module to the picking module;
    wherein before the order data is received, the sheet material to be selected is in an unfold and flattened form, after the order data is received, the selected sheet material is folded and formed into a finished container, the picking module puts the merchandise from the sub-shelf into the container according to the order data, and the plurality of second mobile drive units move the packed container to the sealing module.

2. The order management system according to claim 1, wherein the plurality of picking robot is a robot arm arranged on the picking platform.

3. The order management system according to claim 1, wherein the warehousing facility further comprises at least one shelf accommodating the sub-shelf, and each of the sub-shelves comprises an independent machine-readable optical label correlated to the merchandise.

4. The order management system according to claim 3, wherein the first mobile drive unit comprises a sensor for identifying the label.

5. The order management system according to claim 1, further comprising a computer device which receives the order data and is communicatively connected with and controls the box folding module, the picking module and the sealing module.

6. An order management method for automated logistics based on on-demand box supplying, comprising the following steps:
    receiving an order data;
    selecting a sheet material based on the order data from a plurality of sheet materials with different sizes according to the order data, and folding the sheet material into a finished container by a box folding module, wherein the container is moved by a second mobile drive unit to a picking module;
    moving at least one selected sub-shelf from a warehousing facility to the picking module according to the order data by a first mobile drive unit;
    moving a merchandise from the selected sub-shelf into the container according to the order data by a picking robot; and
    moving the loaded container by the second mobile drive unit to a sealing module, wherein the sealing module performs a sealing operation on the container to form a sealed box.

7. The order management method according to claim 6, wherein before the order data is received, the sheet material to be selected is in an unfold and flattened form.

8. The order management method according to claim 6, wherein after the order data is received, the selected sheet material is folded and formed into the finished container.

* * * * *